May 5, 1970              F. A. KRAMER              3,510,378
CYLINDER FABRICATING MACHINE
Filed March 21, 1967                              10 Sheets-Sheet 1
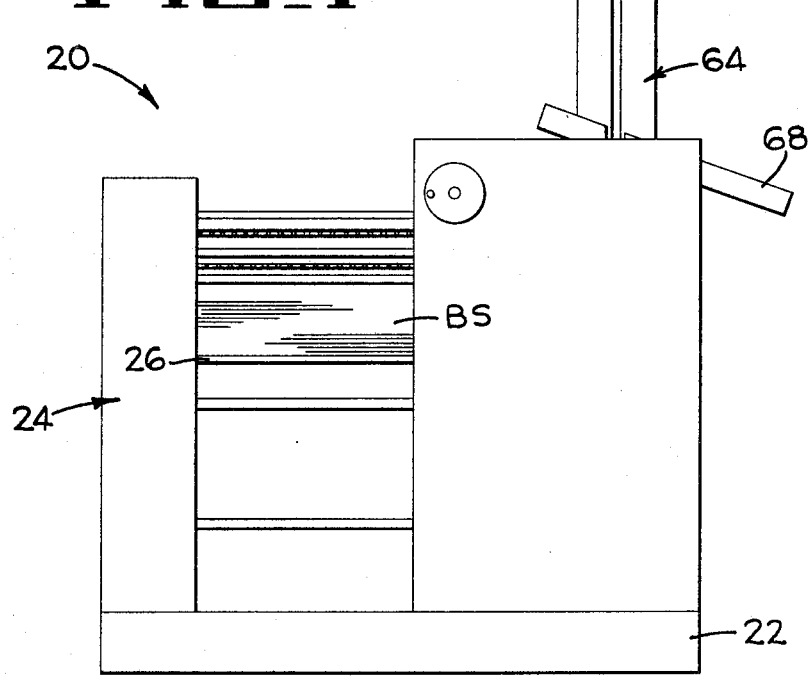
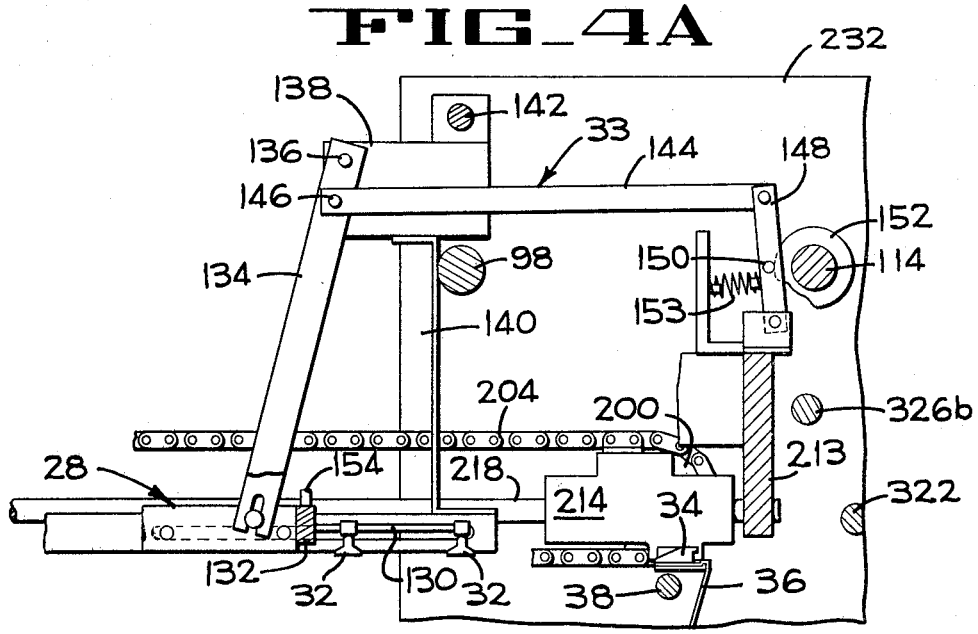
INVENTOR.
FORREST A. KRAMER
BY
Francis W. Anderson
ATTORNEY

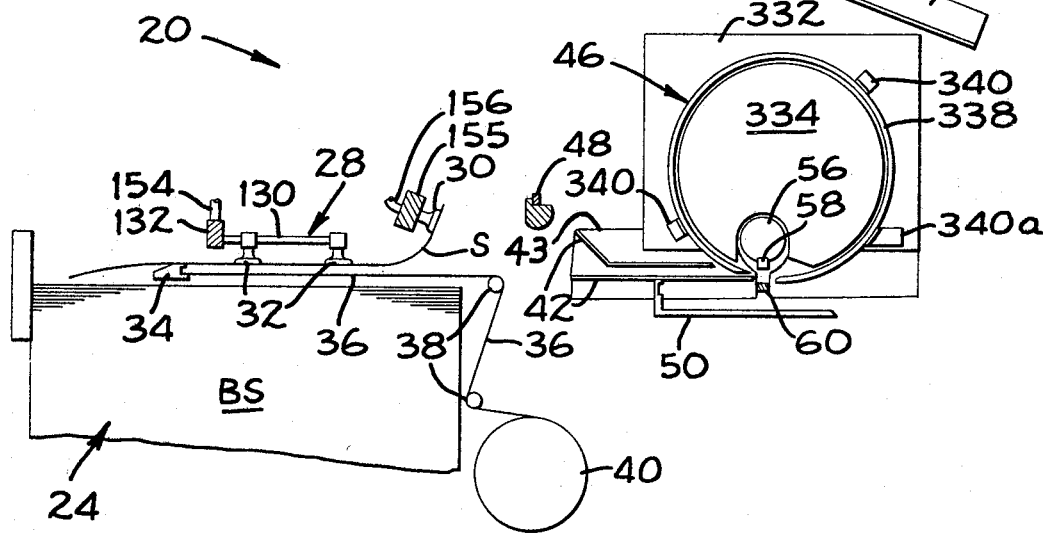
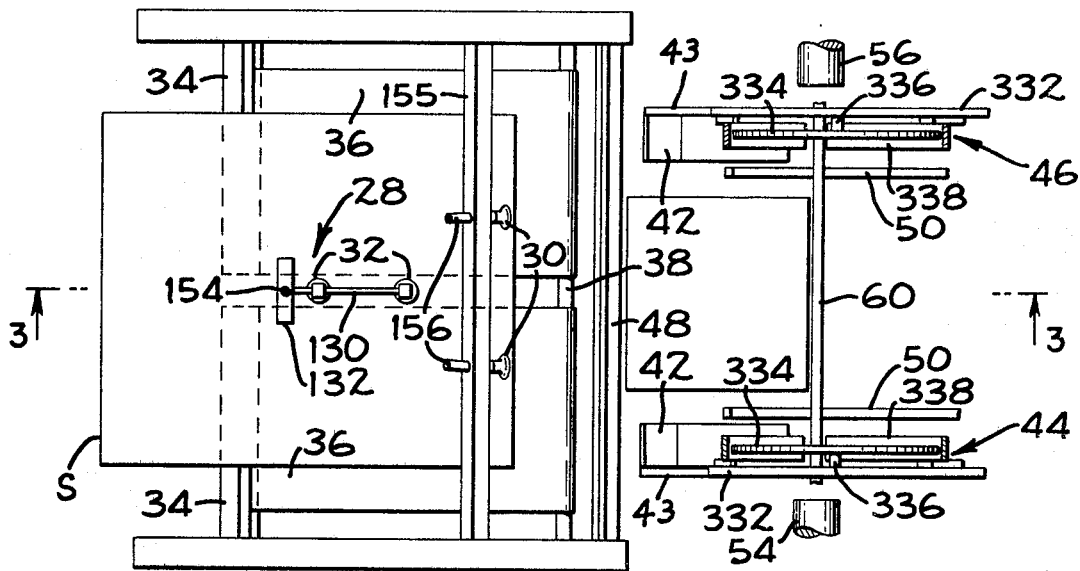

May 5, 1970
F. A. KRAMER
3,510,378
CYLINDER FABRICATING MACHINE
Filed March 21, 1967
10 Sheets-Sheet 3
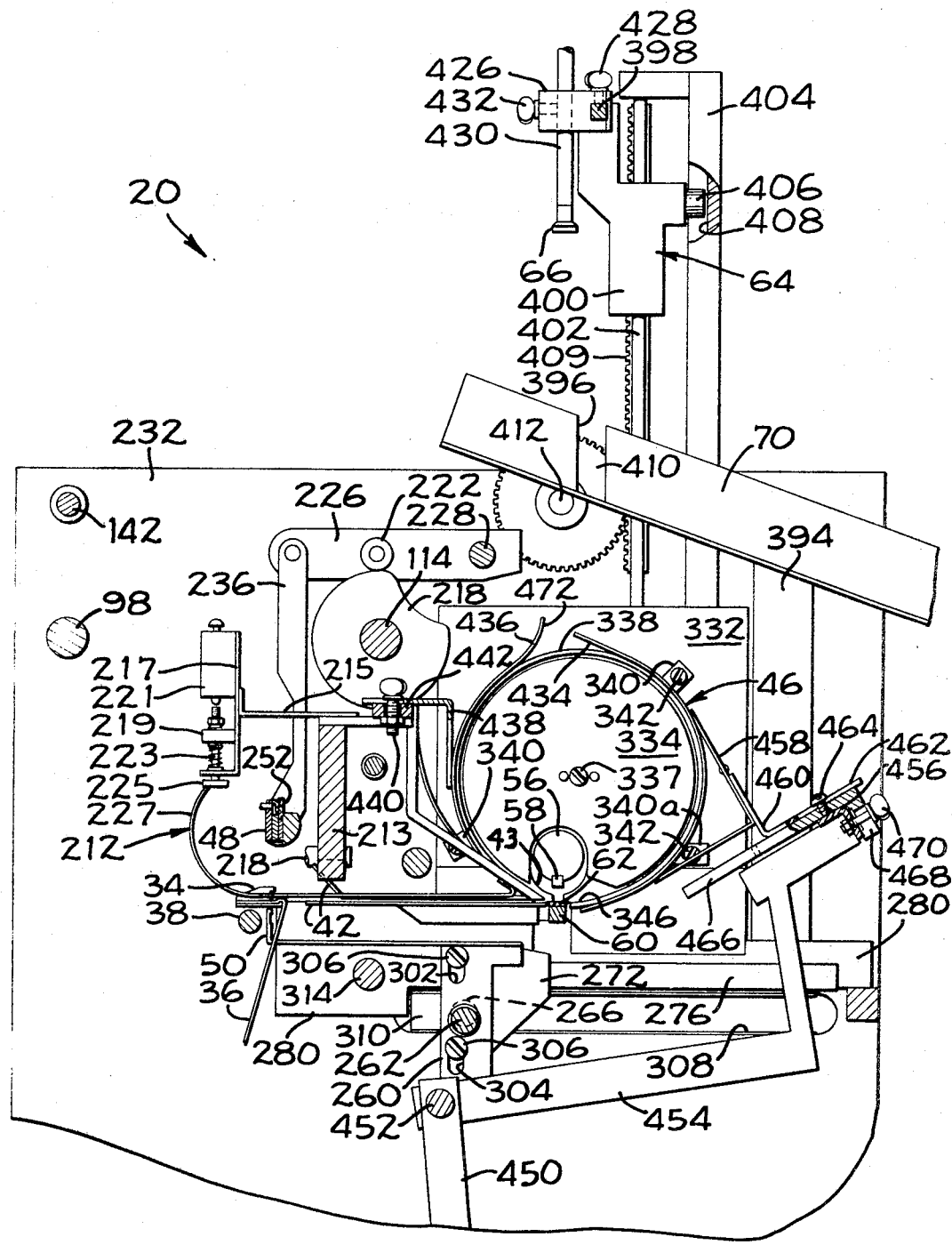
INVENTOR.
FORREST A. KRAMER
BY
*Francis W. Anderson*
ATTORNEY

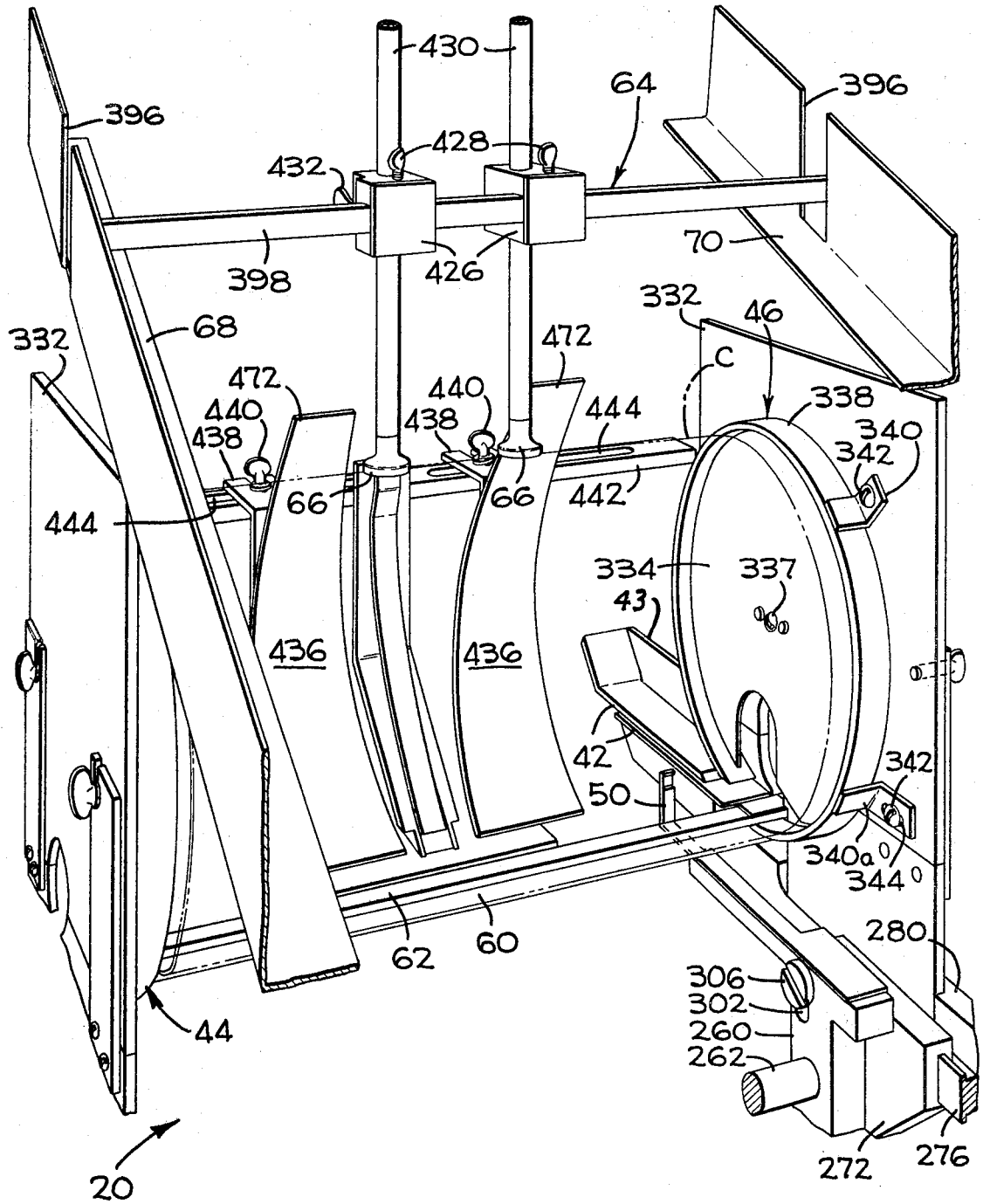

May 5, 1970  F. A. KRAMER  3,510,378
CYLINDER FABRICATING MACHINE
Filed March 21, 1967  10 Sheets-Sheet 5

FIG_6

INVENTOR.
FORREST A. KRAMER
BY
Francis W. Anderson
ATTORNEY

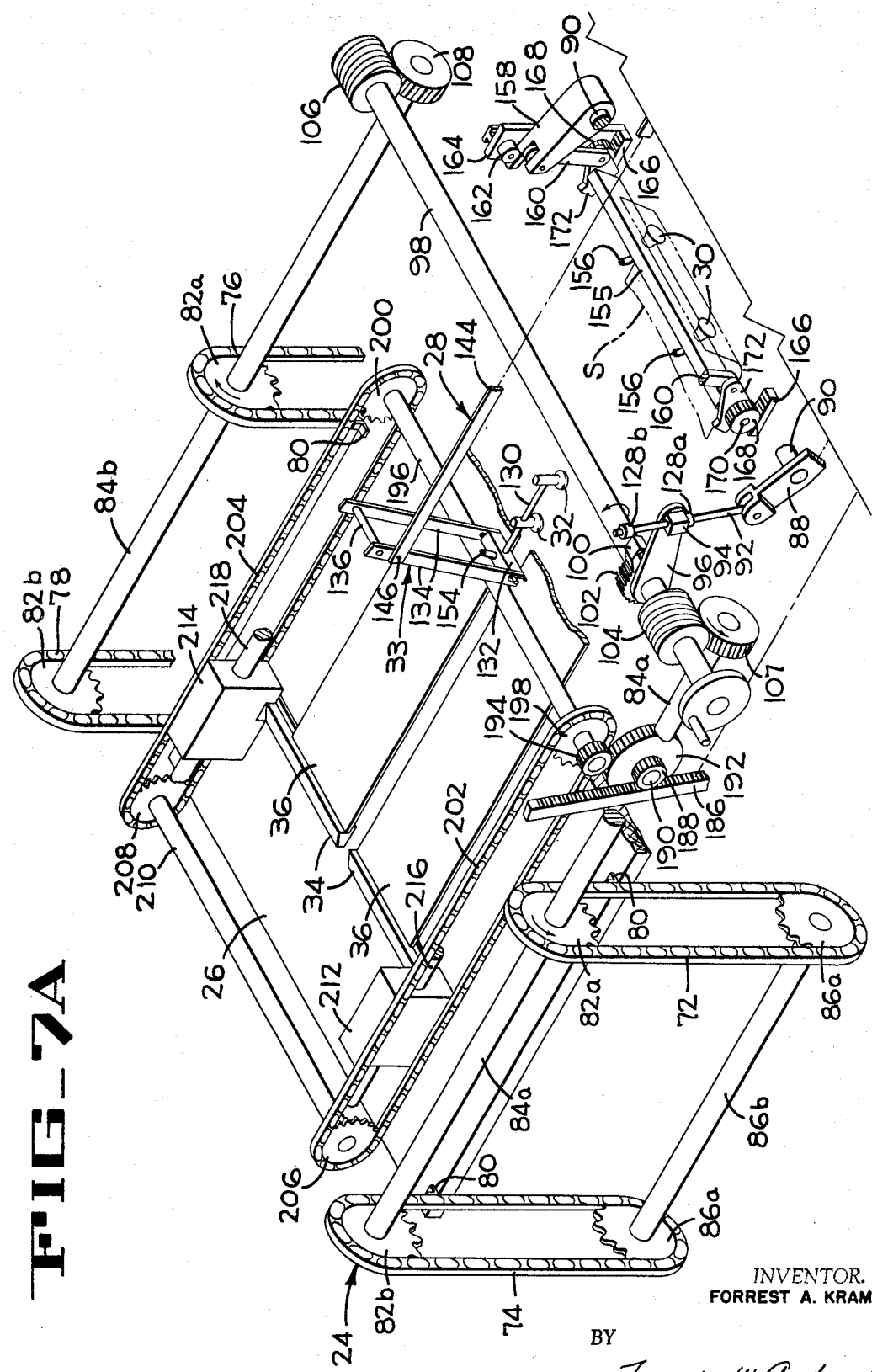

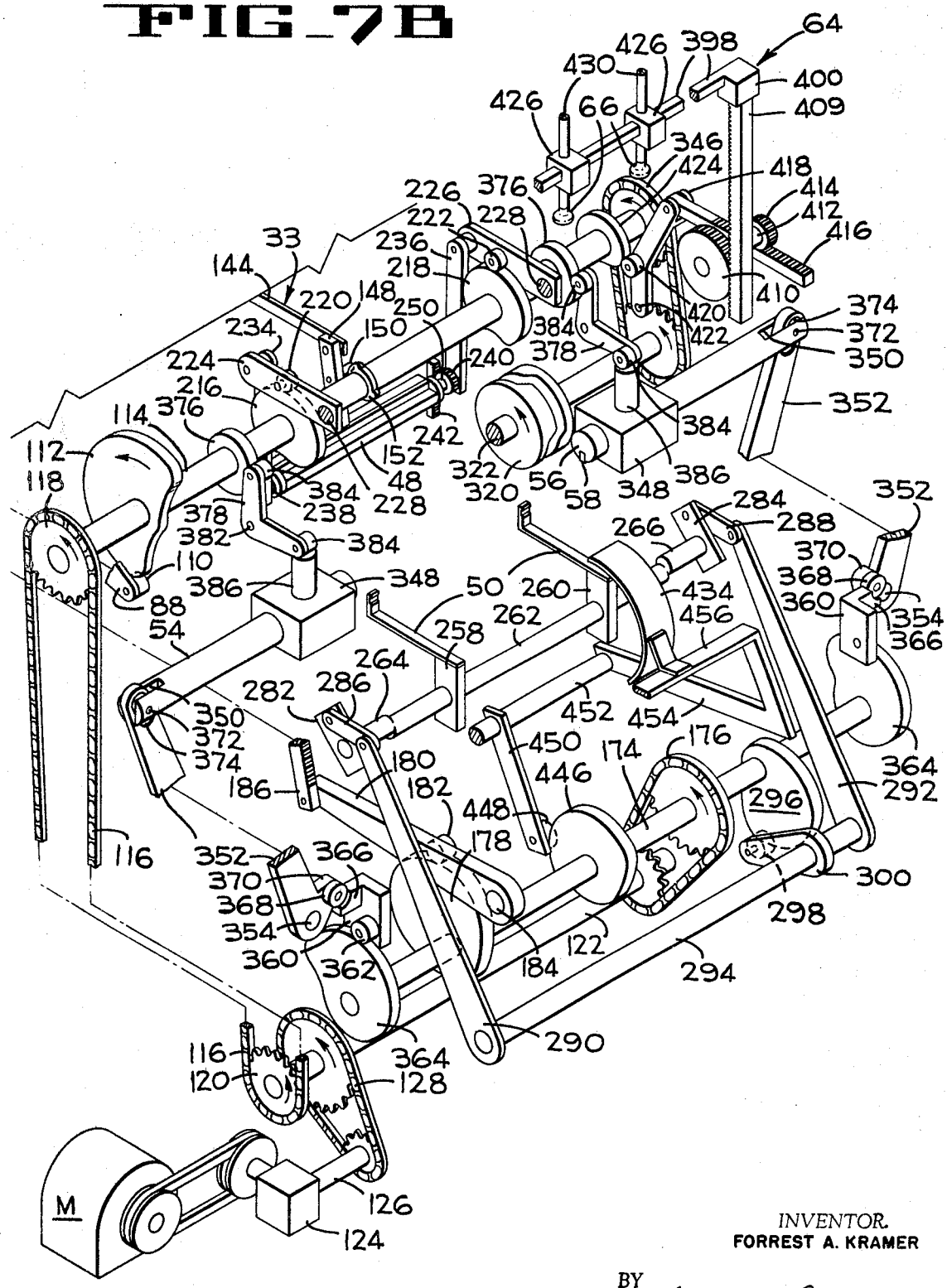

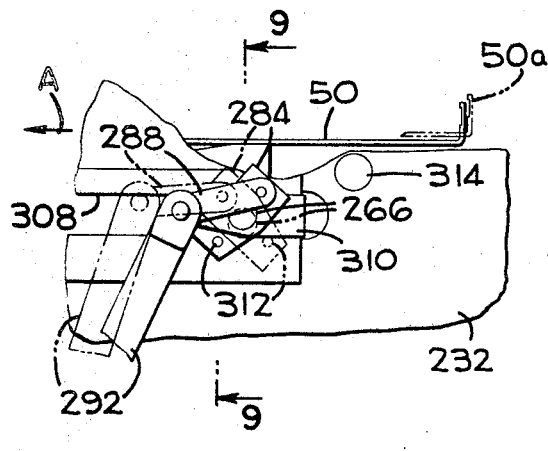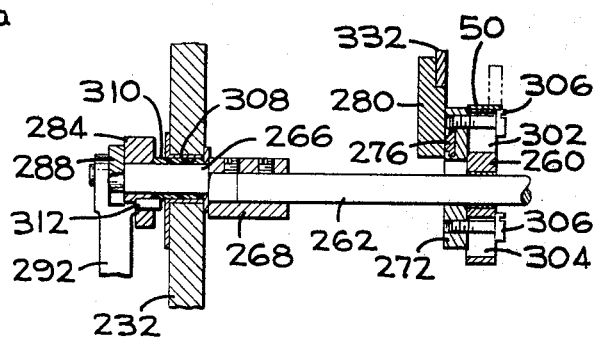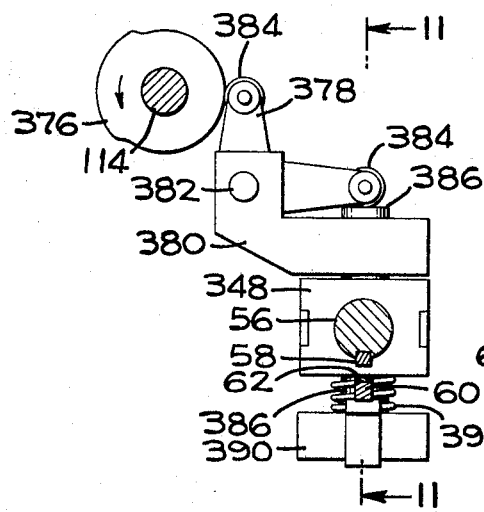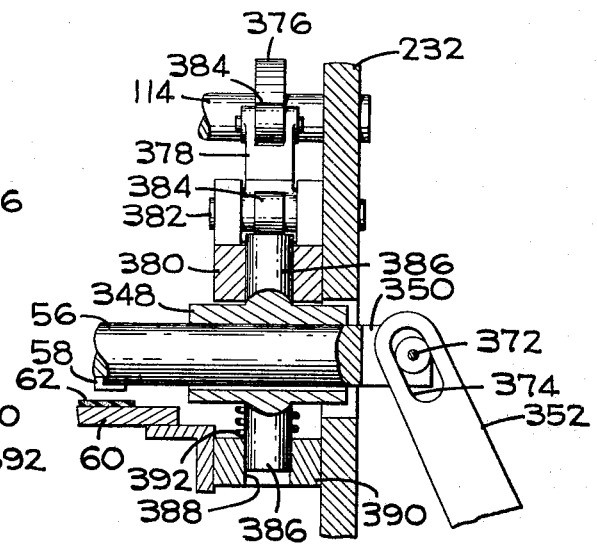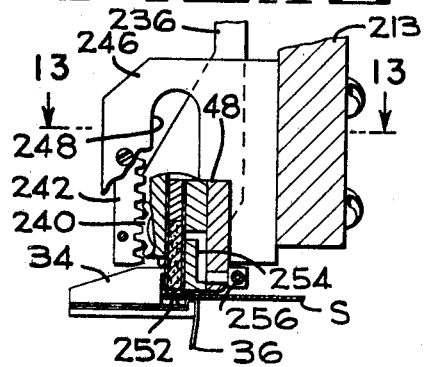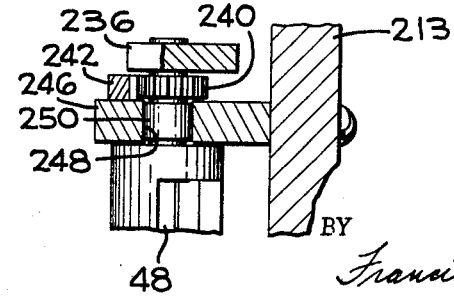
INVENTOR.
FORREST A. KRAMER
BY Francis W. Anderson
ATTORNEY May 5, 1970  F. A. KRAMER  3,510,378
CYLINDER FABRICATING MACHINE
Filed March 21, 1967  10 Sheets-Sheet 9
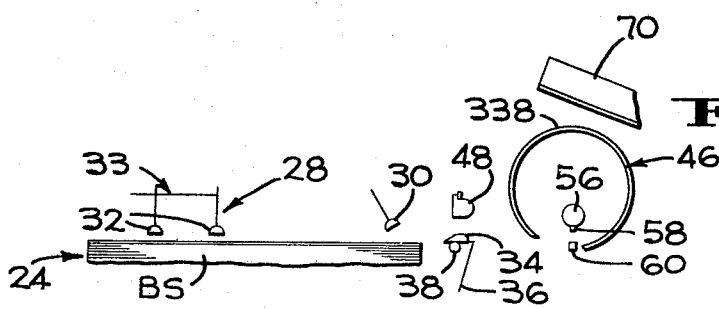
FIG_14A
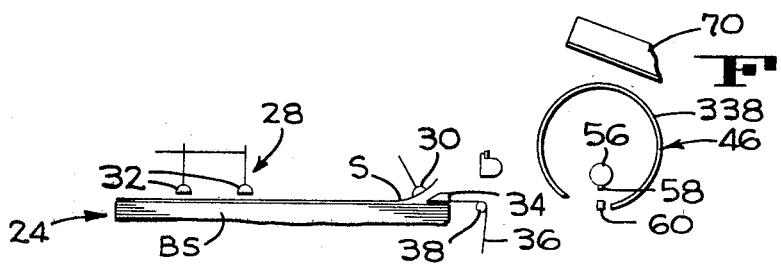
FIG_14B
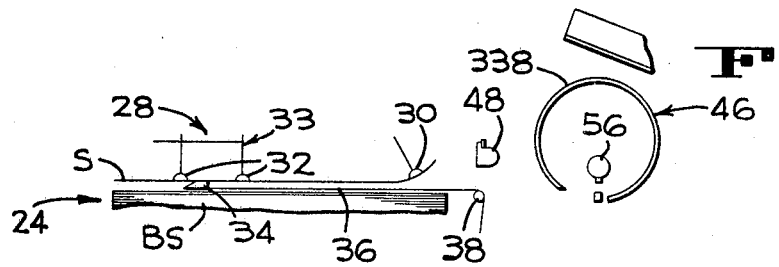
FIG_14C
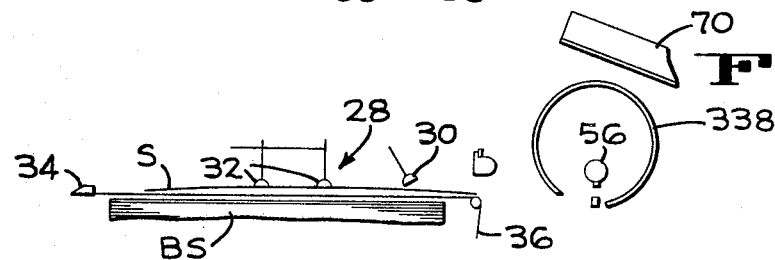
FIG_14D
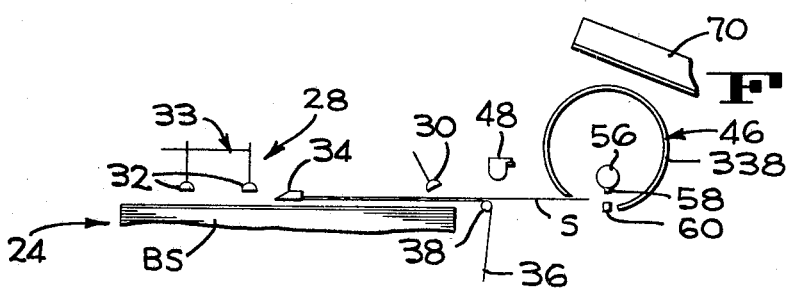
FIG_14E
INVENTOR.
FORREST A. KRAMER
BY Francis W. Anderson
ATTORNEY

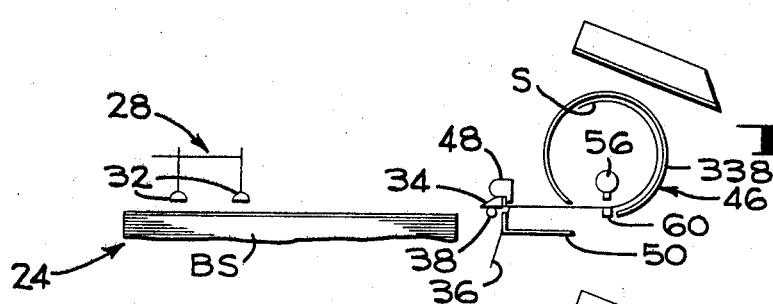
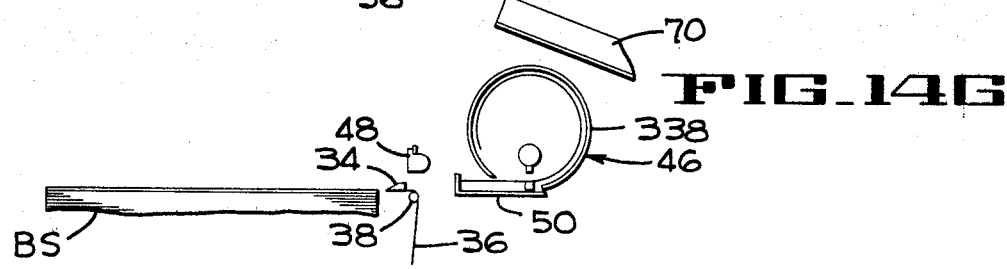
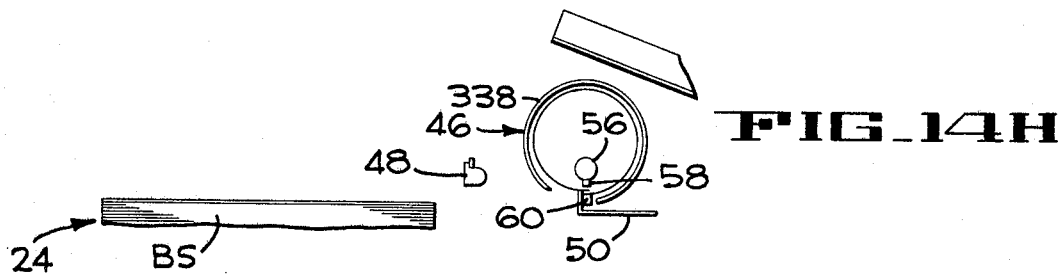
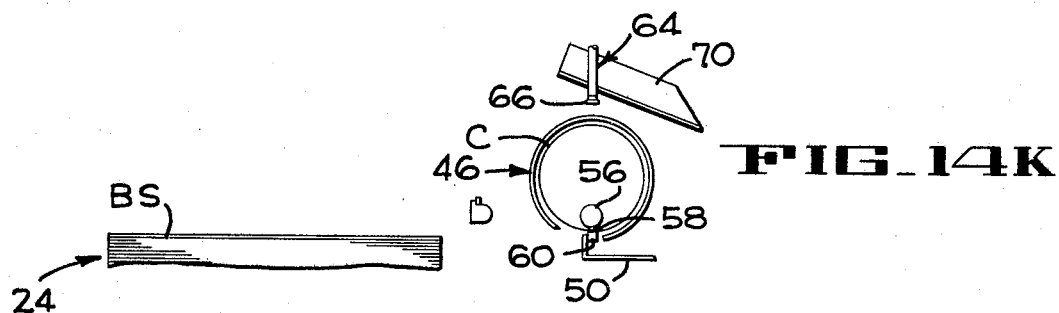
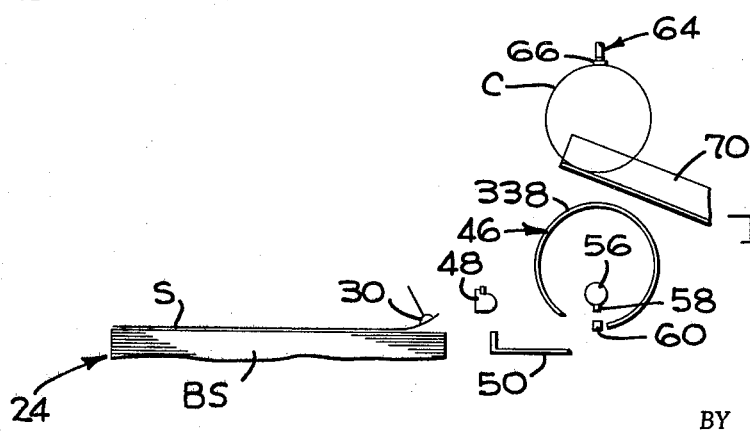

United States Patent Office 3,510,378
Patented May 5, 1970

---

3,510,378
CYLINDER FABRICATING MACHINE
Forrest A. Kramer, Hatboro, Pa., assignor to FMC Corporation, San Jose, Calif., a corporation of Delaware
Filed Mar. 21, 1967, Ser. No. 624,843
Int. Cl. B29d 23/10
U.S. Cl. 156—218                          12 Claims

ABSTRACT OF THE DISCLOSURE

The top sheet of a stack of blanks is fed to cylinder forming mandrels which are arranged to receive the opposite edges of the blank and form it into a cylinder. Before the cylinder is formed the top surface of the trailing end of the blank has adhesive applied thereto. Upon completion of the cylindrical form the leading end of the blank overlaps the trailing end and they are pressed together, thus joining the overlapped ends. This completes formation of the cylinder which is removed from the machine by moving the mandrels out of contact with the ends of the cylinder.

BACKGROUND OF THE INVENTION

Field of invention

This invention relates to the formation of cylindrical objects from precut blanks and more particularly to a method and machine for forming such blanks.

Description of prior art

It is usual practice, in the formation of cylindrical containers, particularly those made of plastic sheet material, such as plasticized paper or fiber, ethylcellulose, vinyl acetate, cellulose acetate, cellulose nitrate, and other similar thermoplastic materials, to take a sheet and hand wrap it about a solid or split mandred whose diameter is such that the ends of the sheet are overlapped. The operator applies appropriate adhesive to the overlapped portions of the sheet to join these ends together. In joining the overlapped ends pressure and/or heat may be applied to the adhesive. Once the bond is made the cylinder is removed from the mandrel where it thereafter may have its opposite ends beaded and supplied with a bottom and top completing the container.

Making the cylinder in this matter requires skilled operators that have achieved the dexterity to produce fast and accurate cylinders. By this method of operation it is possible for a skill operator to make approximately 4,000 cylinders per day. Should this production rate of handmade cylinders appear attractive, other inherent disadvantages of this method of fabrication exist which this invention overcomes.

SUMMARY OF THE INVENTION

In accordance with the present invention a machine is provided which performs all of the above hand operations automatically with an attendant increase in quality and production rate of cylinders. The preferred form of the machine herein disclosed provides a stack of cut blanks associated with a blank feeding mechanism which removes the uppermost one of the blanks and feeds it to cylinder forming mandrels which engage the opposite edges of the blank which die in the direction of feed. At one point during the transfer of the blank to the mandrels a sequentially operable solvent applicator operates to supply solvent to the upper surfaces of the trailing edge of the blank. Between the cylinder forming mandrels curling guides are provides which insure against buckling or deformation of any kind of the cylinder. Once the blank has been completely inserted in the mandrels the leading and trailing edges assume an overlapped relationship and they are pressed together by a split platen which enters the cylinder while it is held in its erected position. This, of course, bonds the overlapped edges.

The platens and the mandrels are then moved away from each other at which time an ejection mechanism removes the completed cylinder from the machine.

It is an important feature of this invention to produce cylinders of a specific and accurately held diameter while keeping a major portion of the stock from which the cylinders are made out of contact with the machine elements. In handmade cylinders a major objection is the evidence of fingerprints and smudges which result from the method of its fabrication. It is also quite difficult, if not impossible, to maintain size in handmade cylinders.

It is a further and equally important feature of this invention to effect adjustment of the machine in a very simple and quick manner to accommodate cylinders of any length between the minimum and maximum range adjustments of the machine. For example, the machine disclosed herein can be adjusted to handle cylinders having a minimum length of 2⅞ inches and a maximum length of 12⅜ inches. Between these dimensions the machine can be adjusted to process any length of blank falling within these bounds.

In contrast to cylinder fabrication methods using a roll of stock from which the desired blank length is cut therefrom, the present invention by using precut blanks provides several advantages, some of which are (a) the blanks can be cut from standard width rolls, (b) the blanks can be screened or gold-leafed printed, (c) ideal for short runs, and (d) most plastic suppliers are equipped and prefer to cut with precut blanks.

BRIEF DESCRIPTION OF THE DRAWINGS

FIG. 1 is a side elevation of a machine employing the features of the present invention, FIG. 2 is a plan view of FIG. 1, FIG. 3 is a longitudinal section taken substantially along the line 3—3 of FIG. 2, FIG. 4 is an enlarged side elevation, partly in section, of the cylinder forming portion of the machine, FIG. 4A is a partial longitudinal section of the mechanism for initially feeding the blank, FIG. 5 is a partial perspective showing another view of the cylinder forming section of the machine, FIG. 6 is a front elevation, partly in section, of the cylinder forming section showing in detail the cams for reciprocating the cylinder forming mandrels and the split platens in their retracted position, FIGS. 7A and 7B considered together is a perspective diagrammatic of the drive train for actuating the blank feeding and cylinder forming elements, FIG. 8 is an enlarged fragmentary view showing the construction of one of the sheet transporting elements, FIG. 9 is a section of FIG. 8 taken substantially along the line 9—9, FIG. 10 is a detail of the mechanism for reciprocating the platens which press the overlapped edges of the blank in contact during the bonding operation, FIG. 11 is a section of FIG. 10 taken substantially along the line 11—11 of FIG. 10, FIG. 12 is a detail of the mechanism which rotates the solvent applicator, FIG. 13 is a section of FIG. 12 taken substantially along the line 13—13, FIGS. 14A–14H, 14K and 14L are diagrammatic illustrations showing a blank being removed from the stack, transported to the cylinder forming mandrels and its removal from the mandrels when the cylinder has been completed.

OVER-ALL ARRANGEMENT

The general arrangement and function of the major components of the cylinder fabricator of the present invention will be briefly explained with reference being made to the indicated figures. The cylinder fabricator, shown in FIG. 1, is generally indicated by the numeral 20 and it comprises a suitable base structure 22 mounting a blank supply and elevator mechanism 24 having a platform 26 on which a stack of blanks BS is supported. The uppermost one of the blanks comes under the influence of a blank pickup and transfer mechanism 28 (FIG. 2) comprising suction cups 30 and 32 which operate, respectively, to pick up the forward edge of the blank and raise the midportion thereof to allow insertion of a pair of reciprocating separator bars 34 to which is attached a pair of flexible sheets 36, hereinafter sometimes referred to as window shades serving to support the blank during transfer thereof to the cylinder forming section of the machine. The flexible sheets 36 is directed around idler shafts 38 and is wound on a spring biased takeup roller 40.

The blank pickup and transfer mechanism 28 transfers the blank through laterally aligned guides 42 (FIGS. 2 and 3) directing the forward edge of the sheet into laterally aligned cylinder forming mandrels 44 and 46. Side plates 43 (FIGS. 2, 4 and 5) close the outer side of the passage defined by the space guides 42 to engage the side edge of the blank, maintain its squared orientation, and to prevent the blanks from shifting while being curled and sealed. The approximate extent to which the sheet is transported by the separator bar 34 is shown in FIG. 14F. Momentarily, continued transfer of the sheet is stopped so that the upper surface of the trailing edge of the sheet may have solvent applied thereto. Solvent is applied by an applicator 48 which is brought in engagement with the sheet while the separator bar 34 is at its forwardmost position. While solvent is being applied to the sheet the bar 34 serves to support the rear end of the sheet (see FIG. 12). After solvent has been applied the applicator moves upwardly and the separator bar 34 is retracted to allow the rear edge of the sheet to be engaged by short stroke pushers 50. That portion of the cycle showing the short stroke pushers in engagement with the rear edge of the sheet is shown in FIG. 14G. The short stroke pushers complete the insertion of the sheet into the mandrels (FIG. 14H) at which time axially aligned laterally reciprocating plungers 54 and 56, each of which carry a radially extending platen 58, bring the overlapped edges of the sheet in firm contact with an underlying stationary platen 60 covered with a strip of rubber of rubber-like material 62. If desired the plungers 54 and 56 or the platen 58 may be heated to assist in bonding the overlapped edges of the sheet.

Upon completion of the bond the plungers 54 and 56 are reciprocated laterally outwardly (FIG. 2) whereupon a discharge mechanism 64 including ejection suction cups 66 make contact with the other surface of the cylinder, raising it to discharge rails 68 and 70 which are inclined to permit the completed cylinder to roll to a collection area. Before the cylinder is able to be removed by the ejection suction cups 66 the mandrels 44 and 46 are also moved laterally outwardly free of the ends of the cylinder.

BLANK ELEVATOR AND FEED MECHANISM

In accordance with the present invention there is provided a suitable elevator mechanism of a conventional nature associated with a novel blank transfer arrangement 28 which is arranged to lift and curl the leading edge of the blank to permit the separator bar 34 and the window shade 36 to pass thereunder and contact the trailing lateral edge of the sheet so that it may be transferred to the cylinder forming mandrels 44 and 46. As shown best in FIG. 7A it will be observed that the blank supporting platform 26 is attached to sprocket chains 72, 74, 76 and 78 by small angle brackets 80. Each of the chains is trained about upper sprockets 82a and 82b which are secured, respectively, to shafts 84a and 84b. As shown in FIG. 7A the chains are also trained about lower sprockets 86a which are secured to shafts 86b. It is to be noted that only one set of sprockets 86a and its associated shaft 86b is shown in FIG. 7A but it is to be understood that such an arrangement is also provided for that portion of the machine not visible in FIG. 7A. As will be made clear the platform 26 is raised in increments depending upon the thickness of the sheets in the stack BS.

A lever 88, secured to a shaft 90, has pivotally connected thereto a rod 92 which is freely slidable through a bore in a small block 94 pivotally connected on another link 96 which is fixed to a lateral shaft 98. On the link 96 a pawl 100 is suitably mounted and is operates to rotate a ratchet wheel 102 which is keyed to the shaft 98. Also keyed to the shaft 98 are longitudinally spaced worms 104 and 106 which are meshingly engaged, respectively, with gears 107 and 108 which are secured to the shafts 84a and 84b.

As shown in FIG. 7B the lever 88 has rotatably mounted thereon a cam follower roller 110 which is in engagement with a cam 112 fixed to a shaft 114. Rotation is imparted to the shaft 114 by a sprocket chain 116, trained about a sprocket 118 secured to the shaft 114, and a sprocket 120 secured to a shaft 122 driven by a suitable motor M. Through a right angle drive 124, the motor drives a shaft 126 which, in turn, imparts torque to the shaft 122 by a sprocket chain arrangement 128. As the shaft 114 rotates the cam 112 oscillates the lever 88 about the axis of the shaft 90. Such oscillation is, in turn, transferred to the link 96 by virtue of engagement of stop collars 128a and 128b, with the block 94. The stop collars can be adjusted to oscillate the link 96 to index the shaft 98 at least one tooth of the ratchet wheel 102 or, if desired, the collars 128a and 128b may be adjusted to increase the amplitude of oscillation of the link 96 thus increasing the incremental angular rotation of the shaft 98. Rotation of the shaft 98 is, by virtue of the worms 104 and 106 and the gears 107 and 108 meshing therewith, transferred to the shafts 84a and 84b. The direction of rotation of the shafts is indicated by the arrows in FIG. 7A and it will be observed they are turning in a direction raising the platform 26. It is to be kept in mind that the extent to which the platform 26 moves upwardly with each increment is determined by the thickness of the sheets being processed.

The blank pickup and transfer mechanism 28 is arranged, as mentioned previously, to curl the forward portion of the blank upwardly by the action of the suction cups 30 and to lift a mid-portion of the blank so that the window shades 36, which are attached to the separator bars 34 may be located beneath the blank. The suction cups 32 are associated with a cam operated support structure 33 which is effective to initially move the blank into the laterally aligned guides 42 before the rear edge of the blank comes in engagement with the separator bar 34 which completes the initial feeding of the blank (FIG. 14F). Referring now to FIG. 7A and 4A it will be seen that the suction cups 32 are mounted on a conduit 130 which is attached to a cross brace 132 pivotally connected at the lower end of upwardly extending links 134. The upper portion of the links 134 are interconnected by a spacer rod 136, thus forming a generally rectangular structure. The rod 136 is rotatably mounted in a bracket 138 secured to an upwardly extending support 140. The support 140 is held against rotation by having a shaft 142 passing through the bracket 138 with this shaft being supported by the side plates of the machine. An operating rod 144 is pinned to one of the links 134 at 146 and the other end of this rod is pinned to a lever 148 mounting a cam follower roller 150 which bears against the surface of a cam 152 mounted on the shaft 114. A suitable hose or other type of flexible conduit 154 provides communication of the suction cups 32 with a source of vacuum.

The suction cups 30 which function to lift and curl the forward edge of the sheet are carried on a transverse support 155 and are connected to the source of vacuum by conduits 156. The support 155 is arranged to be lifted and rotated whenever the lever 88 is rocked by the cam 112. Since both ends of the transverse support are similarly constructed only one end, shown in FIG. 7A, will be described. Fixed to the shaft 90 is a lever 158 having a slotted portion in which is disposed, and pivotally connected, a link 160. The upper surface of the lever 158 bears against a roller 162 which is rotatably mounted on a plate 164 which is guided for vertical reciprocation in the frame of the machine. On the lower edge and extending inwardly of the plate 164 there is attached a small rack 166 engaged by a gear 168 fixed to a small stub shaft 170 extending beyond each end of the transverse support 155. Also fixed to the ends of the support 155, laterally inwardly of the gears 168, are small cranks 172 pivotally connected to the links 160.

The movement imparted to the transverse support from the time the vacuum cups 30 engage the upper surface of the forward end of the blank will now be described. The position of the support bar 155 and the suction cups 30 shown in FIG. 7A is similar to that shown in FIG. 14C wherein the cups 30 are shown to be in engagement with the forward end of the blank. There are three movements which the bar 155 experiences during each cycle of the machine. When the cam roller 110 is on that portion of the cam 112 which rotates the lever 88 in a clockwise direction as viewed in FIG. 7A, the lever 158, which is keyed to the shaft 90, obviously rotates in the same direction. Since, as explained previously, the plate 164 is mounted for vertical reciprocation in the frame of the machine, turning of the lever 158 raises the plate 164 and the roller 162 rolls along the upper surface of the lever 158. By virtue of the link 160 the transverse support 155 is rotated, while at the same time the support moves in a rearward direction due to rotation of the gear 168 along the rack 166. Accordingly, it can be seen that the above described mechanism raises the support bar 155, causes it to rotate, and be translated rearwardly. These combinations of movements in addition to raising and curling the forward edge of the sheet prevents its movement relative to the suction cups 32, which, as shown in FIG. 14C, are firmly engaged with the trailing portion of the blank.

The machine is so timed that the suction cups 32 engage the upper surface of the sheet immediately after the suction cups 30 are firmly in engagement with the sheet. On initial contact with the sheet the cam 152 urges the operating rod 144 rearwardly thereby locating the vacuum cups 32 toward the trailing edge of the sheet. A spring 153 is then effective to move the operating rod forwardly causing the cups 32 which are in engagement with the sheet to move it forwardly partially into the lateral guides 42. This is illustrated in FIG. 14D and should be noted that the vacuum for the cups 30 has been released allowing the forward portion of the sheet to again assume its flat condition. In view of this it will be seen that the initial transfer of the blank from the stack to the cylinder forming mandrels is accomplished by the transfer mechanism 28.

While the sheet is in its raised position (FIG. 14C) the window shade 36 which is attached to the separator bar 34 is moving rearwardly below the raised blank. The manner in which the separator bar and the window shade operates will now be described. Referring again to FIGS. 7A and 7B, it will be seen that the shaft 122 drives another shaft 174 through a sprocket and chain arrangement 176. On the shaft 174 there is a cam 178 which oscillates a lever arm 180 having rotatably mounted thereon a cam follower roller 182. The arm 180 is pivotally connected to the frame of the machine at 184. The free end of the arm has pivotally connected thereto a rack 186 (part of which is shown in FIG. 7B and the other in FIG. 7A) which is meshingly engaged with a gear 188 keyed to a shaft 190 which also has a larger gear 192 keyed thereto. The gear 192 meshingly engages a pinion 194 fixed on a transverse shaft 196 to which is attached sprockets 198 and 200. Sprocket chains 202 and 204 are trained respectively about the sprockets 198 and 200 and about sprockets 206 and 208 fixed to another transverse shaft 210. On the upper runs of the sprocket chains 202 and 204 separator bar carriers 212 and 214 are attached and they are guided for rectilinear movement by guide rails 216 and 218. As shown in FIG. 7A the separator bar 34 is attached to the separator bar carriers 212 and 214.

Operation of the separator bar 34 and its attendant window shade 36 is as follows. During rotation of the shaft 174 the cam 178 is effective to oscillate the lever arm 180 which in turn causes reciprocation of the rack 186. By virtue of the gear 188 and the gear 192 such reciprocation of the rack 186 causes rotation of the shaft 196 and, of course, by virtue of the sprocket chains 204 and 202, rotation of the shaft 210. When the rack 186 is moving upwardly, as viewed in FIG. 7A, the carriers 212 and 214 are moving rearwardly so that the separator bar 34 may engage the rearward end of the sheet. The approximate extent to which the separator bar moves rearwardly is shown in FIG. 14D. As the shaft 174 continues to rotate the rack 186 moves downwardly reversing the direction of the carriers 212 and 214 and, accordingly, moving the separator bar forwardly where it engages the rearward end of the sheet inserting it into the forming mandrels. The limit of forward movement of the separator bar 34 is shown in FIG. 14F. It is to be understood that while the transfer mechanism 28, which includes the vacuum cups 32, initially inserts the sheet into the lateral guides 42, vacuum is cut off from the vacuum cups 32 before the separator bar 34 engages the rearward end of the sheet. If it were otherwise, buckling or damage to the sheet would occur.

The extent to which the sheet is transported while it is supported by the window shade 36 and pushed by the separator bar 34 is shown in FIG. 14F. When the separator bar arrives at this point it will be noticed that the sheet has been inserted into the forming mandrels 44 and 46 a sufficient distance to curl the sheet approximately one-half of its length. While the separator bar is still in engagement with the sheet the solvent applicator 48 is actuated coming down to apply a strip of solvent to the upper surface of the trailing edge of the blank. This relationsip of the separator bar 34 and the solvent applicator 48 is shown in FIGS. 12 and 14F.

Should the sheet encounter any condition which causes it to buckle as it is being disposed in the guides 42 a jam detector, generally indicated by the numeral 211 in FIG. 4, is provided. The detector serves to open a circuit stopping operation of the machine. On a transverse bar 213 a support bracket 215 is secured. This bracket is attached to another bracket 217 supporting a block 219 and a switch 221 which is actuated by a spring biased plunger 223 slidably mounted in a hole formed in the block 219. As shown in FIG. 4 the lower end of the plunger 223 carries a button 225 which is in contact with an easily deflectable curved wire 227. The wire is located above the center of the sheet as it is moved to the forming mandrels 44 and 46. In the event there is sufficient resistance to movement of the sheet causing it to deform, the wire 227 will be deflected causing upward displacement of the plunger 223. This will actuate the switch 221 thereby stopping the machine. Any suitable warning signal, such as a light or audible device, may be energized by the switch 221 to warn the operator of a jam condition.

In describing the construction and operation of the solvent applicator reference will be made to FIGS. 4, 7B, 12, 13 and 14D–14G. As shown in FIG. 7B, in addition to the cam 112, the shaft 114 also has mounted thereon, in axially spaced relationship, cams 216 and 218 rollingly engaging cam rollers 220 and 222 which are rotatably mounted on levers 224 and 226. One end of these levers is fixed to a shaft 228 (FIG. 4) which is, in turn, supported by the upright side frame members 230 and 232 (FIG. 6). The other end of the shaft pivotally supports downwardly extending links 234 and 236. The solvent applicator is rotatably mounted at the lower end of these links. The applicator structure provides short stub shaft portions on each end thereof on which are keyed gears 238 and 240, each of which engage a stationary rack 242 (only one of which is shown in FIG. 7B) which effect rotation of the applicator 48 in a manner and for a purpose which will be hereinafter described.

FIGS. 12 and 13 illustrate the construction provided at each end of the applicator bar and since the construction is identical at both ends of the applicator bar description of one end will suffice for both. There is secured, to the stationary support member 213, a plate 246 having a slot 248 formed therein for slidably receiving a portion of a shaft 250 extending axially outwardly from the end of the applicator bar. The rack 242 is attached to the plate 246 so that meshing engagement with the gear 240 is maintained. The outer portion of the shaft 250 is rotatably mounted at the lower end of the link 236.

Referring now to FIG. 7B, it will be apparent that upon rotation of the shaft 114, the cams 216 and 218, which are attached thereto, cause pivotal movement of the levers 224 and 226 by virtue of the cam rollers 220 and 222 carried by these levers. Such pivotal movement reciprocates the links 234 and 236 which, in turn, raise and lower the applicator bar 48 and in doing so the applicator bar is rotated by virtue of the gear 240 and the rack 242. Examination of FIGS. 14D, 14E and 14F shows rotation of the applicator bar as it is raised and lowered by the links 234 and 236.

The machine is timed so that when the separator bar 34 reaches the limit of its forward movement (see FIG. 12) a portion of the trailing edge of the sheet S is located directly below the solvent applicator 48. The solvent applicator is of usual construction including a wick 252, which may be made of natural fiber or porous metal, supplied with solvent in any desired manner. In the present invention communicating passageways 254 are supplied with solvent by a flexible conduit 256 connected to a reservoir. By rotating the solvent applicator so that the wick is directed upwardly (for example, see FIG. 14H) prevents oversupply of solvent to the wick and thus guards against dripping of solvent on random areas of the sheet. Firm engagement of the wick with the trailing portion of the upper surface of the sheet is provided by the separator bar 34 since at the limit of its forward movement it provides a continuous transverse support for the sheet when solvent is applied thereto.

At that portion of the cycle when the separator bar reaches the forward limit of its travel the machine dwells for a sufficient time to allow application of solvent to the sheet and upward movement of the applicator bar 48. Upon completion of this phase of the cycle the short stroke pushers 50 are rendered operative to engage the rear end of the sheet and complete insertion thereof into the mandrels. Reference to FIGS. 14F, 14G and 14H illustrate the action of the short stroke pushers 50. In describing the construction and operation of the short stroke pushers reference will be made to FIGS. 4, 7B, 8 and 9.

Referring first to FIG. 7B, it will be seen that the short stroke pushers 50 are rigidly connected to blocks 258 and 260 which are rotatably mounted on a shaft 262. This shaft has eccentric end portions 264 and 266 which are joined to the shaft 262 by couplings 268 (FIG. 9). As shown in FIG. 6 the blocks 258 and 260 are mounted to slider shoes 270 and 272. Each of the slider shoes have a T slot for receiving T guide rails 274 and 276 fixed to support bars 278 and 280.

As will be presently described the eccentrics 264 and 266 operate to raise the short stroke pushers for engagement with the rearward edge of the sheet before the short stroke pusher moves forwardly thereby completing insertion of the sheet into the mandrels 44 and 46. This is shown in FIG. 14G. Fixed to the end of each of the eccentric portions 264 and 266 are generally rectangular links 282 and 284 which have pinned thereto connecting links 286 and 288 pivotally connected to operating arms 290 and 292. The arms are secured to the transverse shaft 294 which is rotatably mounted in the side frames 230 and 232. A cam 296 keyed to the shaft 174 is rollingly engaged by a cam follower roller 298 rotatably mounted on a crank arm 300 which is also keyed to the shaft 294.

In operation as the shaft 174 rotates thereby rotating the cam 296 therewith, the crank arm 300 is oscillated by virtue of the cam follower roller 298 following the contour of the cam 296. This in turn oscillates the shaft 294 and the operating arms 290 and 292. This action, by virtue of the links 282, 284, 286 and 288, translates the short stroke pushers toward and away from the mandrels 44 and 46.

During such movement of the short stroke pushers they are constrained to follow a rectilinear path by virtue of the T guide rails 274 and 276.

Means are provided associated with each of the eccentrics 264 and 266 to rotate the shaft 262 to raise the short stroke pushers 50 so that they may engage the rearward edge of the sheet. Since this arrangement is identical for both ends of the shaft 262, only one will be described which is shown in FIGS. 8 and 9. The block 260 is provided with vertical elongate slots 302 and 304 through which extend guide pins 306 threaded into the slider shoe 272. This arrangement permits the block 260 to be reciprocated upwardly and downwardly whenever the shaft 262 is rotated. As will be evident this action raises and lowers the short stroke pusher 50 as the shaft 262 is rotated. The eccentric portion 266 extends through an elongate slot 308 (FIG. 4) formed in the side frame member 232 and it is rotatably received within a slider block 310 preferably made of a suitable plastic. Secured to the rectangular link 284 is a small pin 312 which engages the lower edge of the block 310 and serves to limit the extent to which the link 284 is rotated.

Reference will be made to FIG. 8 in describing the operation of the links 284, 288, 292, the block 310 and the pin 312. When the arm 292 is oscillated moving the pusher block 260 to its rearwardmost position. The relationship of the links 284 and 288 are shown in full outline. It will be noted that the pin 312 limits the clockwise rotation of the link 284. At this time eccentric 266 rotates the shaft 262 locating the short stroke pusher 50 in its lowered position which is also shown in full outline in FIG. 8. As soon as the arm 292 starts its forward movement (arrow A in FIG. 8), the link 288 rotates the link 284 and, accordingly, the shaft 262, raising the short stroke pusher to the position indicated by 50a. This, therefore, permits the short stroke pusher to engage the rearward end of the sheet so that it may be fully inserted into the forming mandrels 44 and 46. On the return stroke the arms 290 and 292, through the links 286 and 288, rotate the eccentrics 264 and 266 lowering the short stroke pusher to condition it to engage a subsequent sheet.

The cylinder forming section of this invention which includes the mandrels 44 and 46 is arranged to be easily adjustable to produce cylinders of any length between the dimensions of 2⅞ inches to 12⅝ inches. These dimensions are only illustrative of a specific range and it is therefore to be appreciated that the principle of this invention can be utilized for making cylinders of any desired practical length. The support bars 278 and 280 have the rearward portion thereof slidably mounted on a transverse shaft 314 (see FIGS. 4 and 6) and each have an outwardly extending lug 316 rotatably supporting a cam follower roller 318. Each of the cam rollers ride in cam tracks of cams 320 which are keyed to a transverse shaft 322. Although the cams 320 are keyed to the shaft 322 provision is made to allow slidable movement of these cams relative to the shaft 322 and yet prevent relative rotation therebetween. Each of the cams 320 are carried by yokes 324, each of which have a threaded bore for receiving adjusting screws 326a and 326b. The adjusting screws are of the opposite hand, that is, the screw 326a may be right-hand and the screw 326b left-hand. The screws are joined together by a coupling 328 of a conventional nature. The screw 326b has a non-threaded portion 326c extending beyond the side frame member 232 and, on the end of which is mounted a hand wheel 330. Rotation of the hand wheel in one direction will simultaneously move the yokes 324, the cams 320 and the support bars 278 and 280 toward each other while rotation of the hand wheel 330 in the opposite direction will move them away from each other. As will be immediately pointed out rotation of the hand wheel will also move the forming mandrels 44 and 46 with the support bars 278 and 280. The shaft portion 326c also has a sprocket and chain 327 associated therewith serving the purpose of making appropriate adjustments in the blank supply and storage mechanism 24. Since this arrangement is of a conventional character description thereof is not deemed necessary.

On the support bars 278 and 280 there is mounted generally rectangular upwardly extending plates 332 which support the mandrels 44 and 46. A circular disc 334 is provided for each mandrel. Between the plates 332 and the discs 334 a spacer block 336 is provided through which extends a screw 337 which is threaded to the plates 332. Surrounding the plates 334 there is a band 338 having secured thereto small angular clips 340 and a clip 304a, the lower right-hand clip as viewed in FIG. 4. The clips are mounted on the rectangular plates 332 by small screws 342. The clip 304a for each band is made with an elongate slot 344 which serves to allow adjustment of the band 338 in order to control the diameter of the cylinders. The first portion of the band encountered by the sheet during its formation is indicated by the numeral 346 and it will be noticed by reference to FIG. 4 that the inner surface of the first portion of the band is substantially tangent to the lateral guides 42 and the platen 60. This, of course, insures easy entrance of the sheet between the inner surface of the band 338 and the circular plate 334. Thus it will be apparent that the band is not a true circle since it is slightly spiraled to provide for insertion of the sheet.

In describing the operation of the cylinder forming mandrels and the manner in which they are actuated to remove a completed cylinder therefrom, reference will be made to FIGS. 6 and 7B. Power from the shaft 114 is transferred to the shaft 322 by a sprocket and chain arrangement 346. With the shaft 322 rotating in the direction indicated by the arrows in FIG. 7B, the cams 320, by virtue of the cam follower rollers 318 attached to the support bars 278 and 280, cause simultaneous inward and outward translation to the mandrels 44 and 46 since they are mounted on the rectangular plates 332 which, in turn, are attached to the support bars 278 and 280. When a cylinder has been completed the cams 320 are effective to move the mandrels outwardly away from each other freeing the ends of the cylinder and the suction cups 66 of the discharge mechanism 64 lift the cylinder to the discharge rails 68 and 70. While still engaged with the suction cups 66 (see FIG. 14L) the cams 320 move the support bars 278 and 280 inwardly toward each other and at this time vacuum is disconnected from the suction cups 66 releasing the cylinder and allowing it to roll down the rails 68 and 70. At that moment when the support bars have moved inwardly toward each other the mandrels are conditioned to receive another sheet.

It is another and important feature of this invention to press the overlapped edges of the cylinder while its ends are engaged with the mandrels. To fulfill this requirement the plungers 54 and 56 are associated with for actuating them inwardly toward each other so that the ends thereof are in abutting engagement to thereby form a continuous beam which applies pressure along the entire length of the overlapped edges of the cylinder. The particular means for fulfilling this function are shown in FIGS. 6, 7B, 10 and 11. The plungers 54 and 56 are slidably mounted in guide shoes 348. The outer ends of each plunger is slotted as indicated in 350 to freely receive one arm 352 of bell cranks which are pivotally connected at 354 to brackets 356. The side frame member 230 and 232 have rigidly attached thereto guideways 358. Vertically slidably mounted on each guideway is a slider block 360 rotatably mounting cam follower rollers 362. The rollers 362 are in contact with cams 364 which are keyed to the shaft 174. Each slider block 360 is formed with an outwardly extending ledge 366 which contacts rollers 368 rotatably mounted on the remaining arm 370 of the bell cranks. As the shaft 174 rotates the cams 364 cause reciprocation of the slider blocks 360 which, in turn, by virtue of the roller 368 in engagement with the ledge 366, causes oscillation of the bell crank. Since the arms 352 are connected to the plungers 56 and 54 by a pin 372 (FIG. 11) passing through a slotted portion 374 on the upper end of each arm 352, such oscillation of the bell cranks cause inward and outward movement of the plungers 54 and 56. The ends of the plungers move inwardly toward the longitudinal axis of the machine and are brought into abutting engagement before they are moved downwardly to effect sealing of the cylinder. Thus, the plungers, in effect, apply a uniformly distributed load to the overlapped edges of the cylinder.

After the plungers have been moved inwardly as explained, means are provided for simultaneously moving them downwardly against the platen 60. The means for effecting this result will be explained in connection with FIGS. 7B, 10 and 11. On the shaft 114 cams 376 are mounted for rotation therewith. Bell cranks 378 are pivotally connected in a bracket 380 by means of a pin 382 which also extends through the side frames 230 and 232 (FIG. 11). Each arm of the bell crank 378 is provided with rollers 384, one of which rollingly engages the cams 376 and the other, one of two radial projections 386 which are integral with the guide shoes 348. As shown in FIG. 11 one of the projections extends through and is slidably mounted in a bore formed in the bracket 380 whereas the other is slidably mounted in a bore 388 of a small block 390 which is suitably secured to the side frame 232. It is to be understood that both of the guide shoes 348 are identical in construction and arrangement.

After the sheet has been fully inserted into the forming mandrels 44 and 46, the plungers 54 and 56 move inwardly toward each other until their ends are in abutting engagement. At this time the cams 376 rotate the bell cranks 378 (in a clockwise direction as viewed in FIG. 10) urging the plungers downwardly thereby bringing the platens 58 in firm contact with the underlying strip of rubber or rubber-like material 62 (see FIG. 14K). This, of course, presses the overlapping edges of the cylinder together forming the bond. If desired, suitable electrical heating elements, conventional in the art, may be provided for heating the platens 58 which serve to assist in bonding the longitudinal seam of the cylinder. After the seam has been completed the cam 376 allows the bell cranks 378 to rotate in a counterclockwise direction and for the purpose springs 392 (FIG. 11) are provided between the upper surface of the block 390 and the guide shoes 348. Once the plungers 54 and 56 are raised they are moved outwardly to permit removal of the completed cylinder by the discharge mechanism 64. In view of the above, it should be readily apparent that the present invention provides a very simple and effective mechanism to form the longitudinal seam of the cylinder while the ends of the cylinder are rigidly supported in the forming mandrels 44 and 46. This manner of forming the longitudinal seam produces a right circular cylinder of the desired commercial quality.

The remaining major sub-assembly of the present invention concerns the discharge mechanism 64 which includes the rails 68 and 70. The discharge mechanism is arranged for cyclic operation rendering it effective to remove the completed cylinder after the plungers 54 and 56 and the mandrels 44 and 46 have been retraced. Each of the guide rails 68 and 70 are attached at the upper end of upright supports 394 which are rigidly connected at their lower ends to the support bar 278 and 280 (FIG. 6). The rails are preferably angle irons supported so that one web vertically and the other horizontally.

As shown in FIGS. 4 and 5 each of the vertical webs of the rails have a cut-out portion 396 providing clearance for a rectangular support bar 398 that has one end rigidly connected to a vertically reciprocable carrier 400. The carrier is guided for such vertical reciprocation by a guide rod 402, the upper end of which is secured to a frame 404 attached to the side frame member 232. The carrier 400 also has a guide roller 406 traveling in a track 408 formed in the frame 404. The effect of the guide rod 402 and the roller 406 which engages the track 408 is to prevent turning of the carrier 400 as it moves upwardly and downwardly. The carrier 400 is suitably rigidly connected to a rack 409 in meshing engagement with a gear 410 keyed to a shaft 412 which extends through the side frame member 232. On the other end of the shaft 412 another gear 414 (FIG. 7B) is rigidly secured and this gear is in meshing engagement with another rack 416. The rack 416 is pivotally connected to a lever 418 rotatably supporting intermediate its ends a cam follower roller 420. The other end of the lever is suitably pivotally connected to the side frame member 232 at 422. On the shaft 114 a cam 424 is keyed and it makes contact with the roller 420 causing oscillation of the lever 418 about the pivot 422. Such oscillation of the lever 418 imparts reciprocation to the rack 416 which, in turn, rotates the shaft 412 and the gear 410 thereby raising and lowering the rack 409 and the carrier 400 which is rigidly connected to the rack 408.

There is slidably mounted on the support bar 398 a pair of blocks 426, each of which has threaded holes for thumbscrews 428. Slidably supported by each of the blocks is a conduit 430 carrying the suction cups 66. Additional thumbscrews 432 are threaded into each block for engagement with the conduits 430. By virtue of this arrangement the blocks 426 can be positioned at any desired point of the support bar 398 by merely manipulating the thumbscrews 428 whereas the elevation of the suction cups 66 relative to the support bar 398 can be adjusted by the thumbscrews 432.

Since the support bar 398 is connected to the carrier 400, the suction cups 66 are raised and lowered in timed sequence with the formation of a cylinder. In FIG. 5 a completed cylinder is shown in phantom outline and is indicated by the letter C. That stage of the cycle in FIG. 5 shows the mandrels 44 and 46 retracted a sufficient distance freeing the ends of the completed cylinder. Before retraction of the mandrels the vacuum cups 66 are brought in contact with the surface of the cylinder so that when the mandrels are retracted, raising of the support bar 398 by the above described rack and pinion arrangement, there is no interference supplied by any of the machine parts to the cylinder as it is raised. It is to be recalled that the rails 68 and 70 also move outwardly a sufficient distance to allow the cylinder to clear the rails. When the support bar has been raised to its upper limit the mandrels 44 and 46 and the rails 68 and 70 move inwardly and it is at this time that suction to the cups 66 is released, allowing the cylinder to be free to roll down the rails to any convenient receptacle.

It is another and further feature of this invention to provide means engageable with intermediate portions of the sheet as it is being inserted into the mandrel to prevent buckling and to insure the formation of a right circular cylinder. These means will be referred to as front and rear curling guides 434 and 436, respectively. Their relationship is best shown in FIG. 4. The rear curling guides 436 (FIG. 5) are wide strips of metal having a radius of curvature substantially equal to the radius of curvature of the cylinder being formed. As is apparent, during the insertion of a sheet into the mandrels 44 and 46, the curling guides provide intermediate surfaces which prevent buckling or bowing of the sheet during formation and completion of the cylinder. Each of the rear curling guides are secured to the bracket 438 which is slotted for reception of a thumbscrew 440. The brackets 438 are disposed upon a transverse bar 442 provided with elongated slots 444 which allow the curling guides 436 to be transversely adjustable. As is evident from FIG. 5 the thumbscrew serves to secure the curling guides at the desired intermediate portion of the cylinder being formed and thus provide the lateral support to the cylinder during its formation.

To allow removal of the cylinder after its completion the front curling guides 434 are mounted on a cam operated support that is moved toward and away from the rear curling guides 436. The arrangement for effecting this movement will be described in connection with one of the front curling guides shown in FIG. 7B. A cam 446, in rolling engagement with a cam follower roller 448, is secured to the shaft 174. The roller 448 is carried by a link 450 fixed to a transverse shaft 452. Also secured to the shaft 452 is an arm 454 having an inwardly directed transversely extending portion 456 on which are adjustably mounted the front curling guides 434. During rotation of the shaft 174 the arm 454 is oscillated by virtue of the cam and roller arrangement 446 and 448, respectively. The timing of this arrangement is such that when the longitudinal seam of the cylinder has been formed and the mandrels have been retracted the shaft 452 is rotated moving the front curling guides forwardly and downwardly a sufficient distance to allow the suction cups 66 of the transfer mechanism 64 to move the cylinder upwardly to the rails 68 and 70.

As shown in FIG. 4 means are also provided for mounting the front curling guides on the transversely extending portion 456 so that they may be adjusted to support the sheet as it is being inserted into the mandrels. To achieve this, each of the front curling guides is attached to an angle bracket 458 which, in turn, is mounted to an L-shaped clip 460. The clip is provided with a slot 462 in which is disposed a bolt 464 threaded into a bracket 466. The bracket 466 is generally L-shaped and it is provided with a slot 468 through which it extends a thumbscrew 470. The thumbscrew also extends through the transverse support 456 which is provided with elongated slots (not shown) so that lateral adjustment of the front curling guides may be achieved. By virtue of the slot 468 the front curling guides may be slightly raised or lowered once the thumbscrew 470 is loosened. As is evident by inspection of FIG. 5, it will be noted that the front curling guide is substantially aligned with the inner surface of the bands 338.

In removing a completed cylinder past the rear curling guides 436 interference will be encountered. However, enough flexibility is provided by the suction cups 66 to permit the cylinder to be displaced forwardly as the rear curling guides are traversed. It is for this reason that the upper end portion of the rear curling guide is arcuately bent as indicated at 472 to prevent scratching or buckling of the cylinder. Once this area has been passed the cups 66 assumes their normal shape.

Accordingly, in view of this invention it should be apparent that a machine is provided which does not require manipulation or handling of the sheets of material during their formation in a cylindrical form. Furthermore, the machine is adapted for great versatility since the diameter of the cylinders can be changed by merely replacing the mandrels and the curling guides whereas the length of the cylinder is easily accomplished by virtue of the adjustment of the rectangular plates 332 which carry the forming mandrels.

Although the best mode contemplated for carrying out the present invention has been herein shown and described, it will be apparent that modification and variation may be made without departing from what is regarded to be the subject matter of the invention as set forth in the appended claims.

I claim:

1. A machine for forming cylinders from precut blanks comprising blank supply means supporting a stack of blanks; means for feeding the upper blank of the stack; means, operative during transfer of the blank, for applying solvent to the upper surface of the trailing end of the blank, lateral guides engaging the sides of the blank as it is being fed; cylinder forming means engaging the lateral edges of the blank for constraining the blank to assume a substantially cylindrical configuration as it is moved by said feeding means; such cylindrical configuration of the blank being such that the leading and trailing ends thereof are overlapped; means for pressing such overlapped ends to render the solvent effective to form a bond; and means for removing the completed cylinder from the machine.

2. The invention according to claim 1 wherein said blank feeding means comprises successively operable mechanisms for incrementally feeding the blank to said cylinder forming means, the first of said mechanisms having suction cups arranged for reciprocable movement and effective to engage the longitudinal edges of the blank with said lateral guides, the second of said mechanisms having a transverse separator bar engageable with the rearward edge of the blank and effective to move the blank upon release of said suction cups, said separator bar being arranged to interrupt movement of the blank at said solvent application to permit application of solvent, and a third of said mechanisms engageable with the rearward end of the blank after retraction of said separator bar, said third mechanism completing insertion of the blank in said cylinder forming means.

3. The invention according to claim 1 wherein said cylinder forming means comprises a support plate, a circular disc mounted on said plate, a generally circular band surrounding said disc and adjustably attached to said plate, said band and the periphery of said disc arranged to define an annular space for passage of the blank during formation of the cylinder.

4. The invention according to claim 3 further comprising means mounting said band on said plate, said mounting means having means for adjusting the radius of curvature of said band which thereby determines the diameter of the cylinder.

5. The invention according to claim 1 further comprising means for simultaneously retracting said cylinder forming means to free the ends of the blank therefrom so that the resulting cylinder can be discharged from the machine.

6. The invention according to claim 1 wherein said means for pressing the overlapped ends of the blank comprise reciprocable axially aligned plungers moveable toward and away from each other relative to the longitudinal axis of the machine, platen means on said plunger for engaging the overlapped ends of the blank, and means operable when said plungers are moved toward each other for moving said plungers transverse to their axis to engage said platen means with the overlapped ends of the blank.

7. The invention according to claim 6 further comprising means for reciprocating said plungers toward and away from each other, said reciprocating means moving said plungers away from each other to permit transfer of a completed cylinder.

8. The invention according to claim 1 wherein said cylinder forming means comprise axially aligned laterally spaced mandrels, and means for reciprocating said mandrels along such axis to effect formation and removal of a cylinder therefrom.

9. The invention according to claim 8 further comprising means intermediate said cylinder forming means for supporting the blank to prevent distortion thereof during insertion of the blank in said cylinder forming means.

10. The invention according to claim 9 wherein said supporting means comprise pairs of confronting arcuate plates having a radius of curvature substantially equal to the radius of the cylinder being formed, and means for translating one of said pairs of plates relative to the other so that the completed cylinder may be removed.

11. The invention according to claim 1 further comprising means supporting said cylinder forming means in laterally aligned relation and for slidable movement toward and away from each other, and means for effecting such movement wherein the distance between said cylinder forming means is determined by the length of the cylinder desired.

12. A method of forming cylinders from precut blanks comprising the steps of transferring a blank from a supply station while its lateral edges pass through guides, interrupting transfer of the blank at a solvent application station, applying solvent to the trailing end thereof, curling the blank to form a cylinder whose ends are overlapped with said curling being performed by directing the lateral edges of the blank in forming mandrels, pressing the overlapped edges together to form a bond, and freeing the ends of the resulting cylinder by displacing such mandrels.

References Cited

UNITED STATES PATENTS

| | | | |
|---|---|---|---|
| 2,685,829 | 8/1954 | Taber | 156—218 |
| 2,753,826 | 7/1956 | Dougherty | 228—48 X |
| 2,912,398 | 11/1959 | Johnson et al. | 156—218 |
| 2,927,624 | 3/1960 | Hughes | 156—466 X |
| 3,386,350 | 6/1968 | Grodberg | 156—457 |
| 3,412,654 | 11/1968 | McCandless | 93—55.1 |

SAMUEL W. ENGLE, Primary Examiner

U.S. Cl. X.R.

93—81, 94; 156—466

FO-1050
(5/69)

UNITED STATES PATENT OFFICE
CERTIFICATE OF CORRECTION

Patent No. 3,510,378　　　　　　　　Dated May 5, 1970

Inventor(s) Forrest A. Kramer

It is certified that error appears in the above-identified patent and that said Letters Patent are hereby corrected as shown below:

Column 9, line 38, "304a" should be --340a--; line 40, "304a" should be --340a--.

Signed and sealed this 30th day of May 1972.

(SEAL)
Attest:

EDWARD M. FLETCHER, JR.　　　　ROBERT GOTTSCHALK
Attesting Officer　　　　　　　　Commissioner of Patents